UNITED STATES PATENT OFFICE 2,202,904

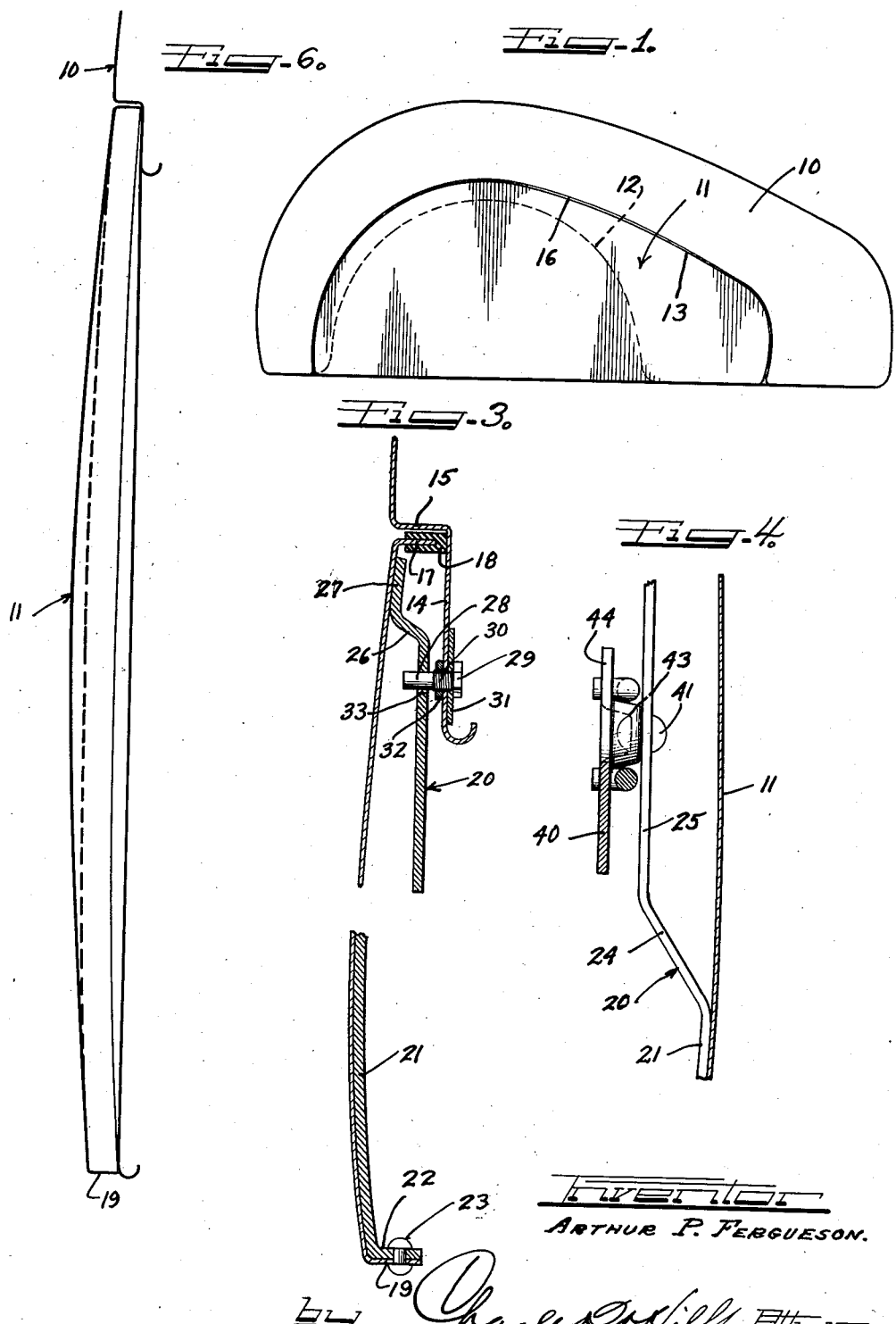

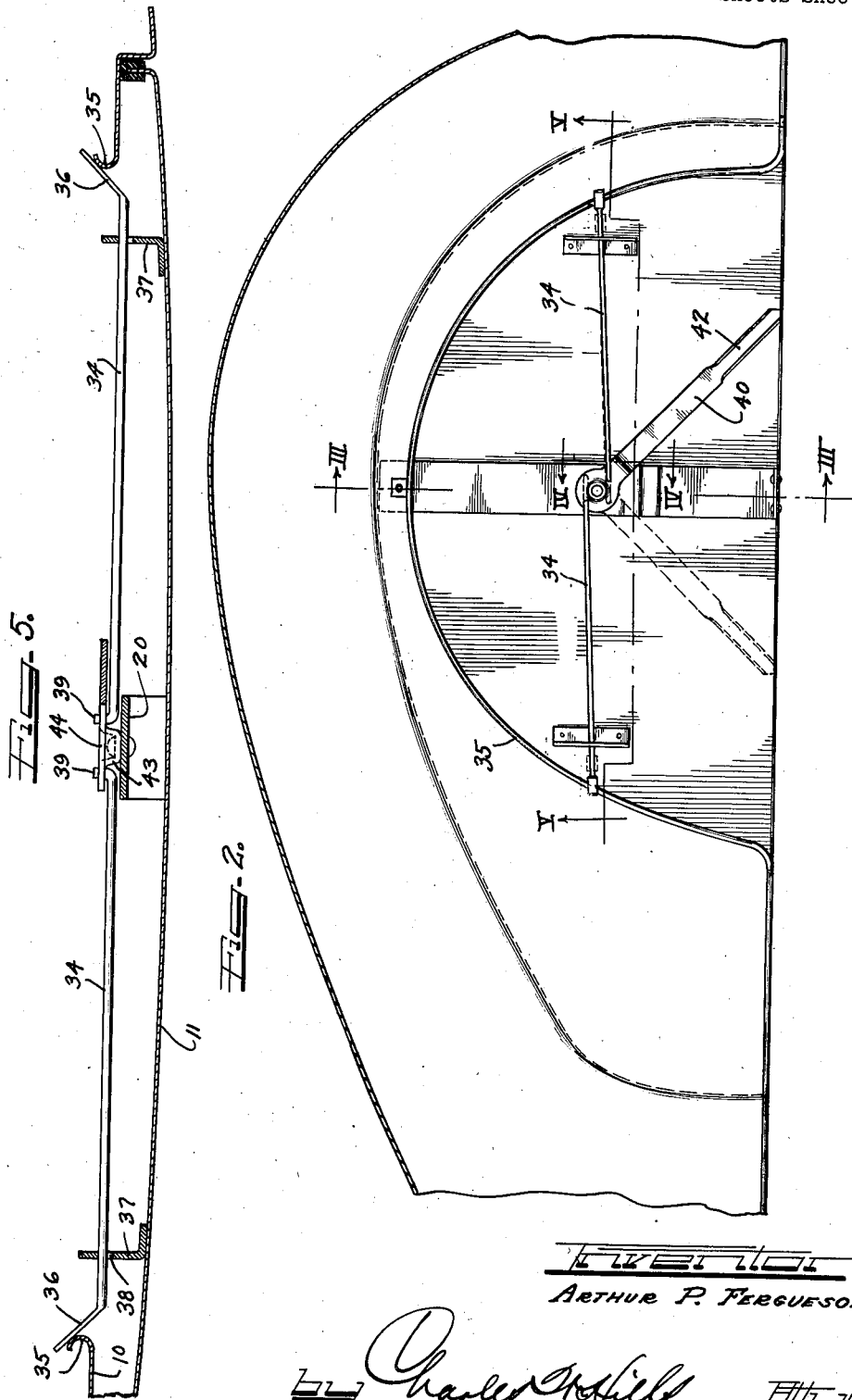

FENDER SHIELD AND MOUNTING

Arthur P. Fergueson, Detroit, Mich., assignor to Houdaille-Hershey Corporation, Detroit, Mich., a corporation of Michigan Application December 30, 1938, Serial No. 248,389

9 Claims. (Cl. 280—153)

This invention relates to fender shields and fender shield assemblies, and more particularly to a fender shield of the type in which the shield is progressively wrapped around its curved edge from the top toward intermediate points along its side and simultaneously from its two lower corners to the same intermediate points along its side. This invention also relates to a novel supporting and mounting means for detachably securing a fender shield to desired position on a vehicle fender or other body part.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. This opening inherently presents an unattractive outward appearance and accordingly detachable fender shields have been employed to substantially cover this opening. As the term "fender shield" shall hereinafter be employed, it refers to any member which is adapted to be secured to a fender or other portion of a vehicle body for the purpose of covering the opening in the fender or vehicle body which is provided for access to or removal of the vehicle wheel. It is also to be understood that the term "fender" is used in a broad sense and it denotes any part of a vehicle body, whether separate or integral, which includes an outer depending side wall which overhangs the vehicle wheel.

It is an object of the present invention to provide a novel fender and fender shield assembly.

It is a further object of this invention to provide a novel fender shield including novel supporting and latching means which is economical to manufacture and which is rugged and reliable in use.

It is a still further object of this invention to provide a novel combination of a fender and a fender shield wherein the fender shield is progressively wrapped into place as it is mounted on the vehicle fender by a flexing of the fender shield simultaneously from the top and from the bottom towards intermediate points along its side edges.

Another and further object of this invention is to provide a novel fender shield assembly in which the fender shield is initially supported at its top and in which it initially engages a portion of a vehicle body part at its top and at its two lower corners but in which the remaining portion of the shield is bowed away from the body part, and in which the fender shield is thereafter flexed progressively by pulling in said bowed portion thereof into tight engagement with the body part of the vehicle.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a front elevational view of a fender shield and fender assembly, illustrating one embodiment of the present invention;

Figure 2 is an enlarged rear elevational view of the fender and fender shield assembly shown in Figure 1;

Figure 3 is an enlarged sectional view of the fender shield with the central portion thereof broken away as taken along the line III—III of Figure 2;

Figure 4 is an enlarged fragmentary sectional view taken along the line IV—IV of Figure 2;

Figure 5 is an enlarged sectional view taken along the line V—V of Figure 2; and, Figure 6 is a diagrammatic end view of the fender shield and fender showing the manner in which the fender shield is progressively flexed into place as it is mounted on the fender.

Referring now to the various figures of the drawings, there is illustrated therein a vehicle fender 10 of the high-crown type which is commonly employed on motor vehicles of the present day. Mounted on and detachably secured to the fender 10 is the fender shield 11 which is preferably streamlined in shape and designed to harmonize with the vehicle fender 10. The outer downwardly depending side wall of the fender 10 is provided with a substantially semicircular opening 12 which affords access to the vehicle wheel (not shown) and permits removal of the wheel therethrough. As shown in the drawings, the outer curved edge 13 of the fender shield 11 is neither designed or shaped to conform to the shape of the wheel access opening 12 of the fender 10.

In order to permit the fender shield 11 to be mounted so that its outer face is flush with the outer face of the fender 10, the fender 10 is provided with a recessed panel portion 14. This offset or recessed panel portion 14 is formed integral with the main body part of the fender 10 and is connected therewith by a laterally extending shoulder 15. The outer marginal boundary of the panel portion 14 as defined by the shoulder 15 extends in a gradual curve above the opening 12 and then down on each side thereof. As may be seen best in Figure 1, the lower end portion of the shoulder 15 at the trailing end of the fender is spaced a substantial distance back from the fender opening 12.

The fender shield 11 is shaped to be substantially coextensive with the offset panel portion 14 of the fender 10, the curved edge 16 of the fender shield 11 being substantially complementary to the outline of the offset panel portion 14. The marginal portion of the fender shield 11 around the curved edge 16 is bent rearwardly to form a flange 17. A strip of cushioning material 18, such for example as rubber, is secured over the end of the rearwardly bent flange 17, and is preferably of such shape and dimension that it will just seat itself within the recessed portion 14 in close proximity to the shoulder 15 (see Figure 3).

The lower or base edge of the fender shield 11 is bent inwardly, as at 19, to provide a base flange on the shield 11.

A mounting and latch mechanism supporting bracket 20 is mounted across the rear face of the fender shield 11 and is disposed in substantially a vertical position thereon. The lower end 21 of the bracket 20 is shaped to lie in intimate contact against the lower rear face of the fender shield 11 and is provided with a rearwardly bent end 22 which is seated on the rearwardly bent base flange 19 of the fender shield 11 and is riveted or otherwise suitably secured thereto, as at 23. The central portion 24 of the bracket 20 is bent obliquely rearwardly and upwardly away from the rear face of the fender shield and then merges into a substantially vertically upwardly extending portion 25 which extends almost to the top of the fender shield 11 (see Figures 3 and 4). The upper extremity of the bracket 20 is bent rearwardly, as at 26 and then upwardly in contact with the rear face of the fender shield 11 as at 27. The tip portion 27 is welded or otherwise suitably secured to the rear face of the fender shield 11.

Vertical supporting means is provided for the fender shield 11 by mounting a pin 28 on the fender 10 immediately above the top of the fender opening 12 (see Figures 2 and 3). The pin 28 has a hexagonal head 29, and a portion of its shank adjacent the head 29 is threaded as at 30. The pin 28 extends outwardly away from the recessed panel portion 14 and is secured in place thereon by means of a washer or threaded collar 31 and a nut 32, the collar 31 and the nut 32 being disposed on opposite sides of the offset panel portion 14. As is clearly shown in Figure 3, the pin 28 is arranged to extend through a hole 33 in the mounting bracket 20 of the fender shield 11, the bracket 20 and the shield 11 being thus hung thereon. Means for vertically supporting the fender shield 11 on the fender 10 has now been described. Additional means must, of course, be provided to hold the fender shield 11 on the supporting pin 28 and restrain lateral movement of the fender shield 11 away from the fender 10. Before describing this additional means, however, reference will be made to the manner in which the fender shield 11 is flexed as it is moved into mounted position on the fender 10.

The fender shield 11 is designed and shaped so that it initially engages a portion of the vehicle body part at its top and at its two lower corners, but in which the remaining portion of the shield is bowed away from the body part. In order to mount the fender shield on the fender 10, it is necessary to progressively flex the shield by pulling in the bowed portion thereof into tight engagement with the body part of the vehicle. More specifically, it is necessary to simultaneously progressively flex or wrap the fender shield from its top and from its two lower corners towards intermediate points along its curved edge. This progressive flexing or wrapping action may best be understood from an examination of the diagrammatic view of the fender and fender shield assembly as shown in Figure 6 of the drawing. It should be remembered in referring to this figure that the diagrammatic illustration is an end view of the fender and fender shield, the full line showing of the fender shield being representative of its shape and position before flexure, and the dotted line showing being representative of the shield in its mounted or flexed position.

The fender shield 11 is shaped and designed so that in its unflexed position it is not possible to seat the fender shield 11 on the fender 10. More specifically, the fender shield 11, when hung on the supporting pin 28, is so arranged that it engages the offset panel portion 14 of the fender 10 in proximity to the supporting pin 28 and also engages the offset panel portion 14 in proximity to its two lower corners but is spaced from the offset panel portion 14 throughout the length of its curved edge between said points of contact. The point of maximum departure of the curved edge 16 of the fender shield 11 from the confronting portion of the offset panel 14 occurs at an intermediate point between the top of the fender shield 11 and the two lower corners. This is clearly shown in Figure 6 of the drawings, where it is shown that the maximum spacing between the full line and the dotted line is intermediate the top and the bottom of the fender shield.

To mount the fender shield 11 on the fender 10 and to move the cushioning bead 18 into tight contact with the offset panel 14 throughout its length, it is necessary to pull the central portion of the fender shield axially inwardly thereby causing a progressive contacting of the curved edge of the fender shield 11 against the fender 10 from its top towards the two intermediate points on either end of the fender shield and from the two lower corners to the same intermediate points. This progressive contacting of the curved edge of the fender shield 11 is brought about by a progressive flexing or wrapping of the fender shield into place. In order to retain the fender shield 11 in its flexed position on the fender 10, it is necessary to provide a latching means which will apply a latching force at intermediate points between the top and the bottom of the fender shield. One specific form of latching means is illustrated in detail in Figures 2, 4 and 5 of the drawings. The latching mechanism comprises in general a pair of oppositely extending substantially horizontally disposed latching arms 34 which are arranged to extend behind and engage the turned marginal edge 35 which defines the fender opening 12. The latching arms 34 may be of any suitable material or shape, but as shown are in the form of metal rods having flattened end portions 36 which extend obliquely rearwardly to permit them to be cammed into place behind the underturned edge 35 of the fender 10. Each latching arm 34 extends through a guide bracket 37 which is welded or otherwise suitably secured to the rear face of the fender shield 11 and which is provided with an aperture 38 through which the latching arm may freely slide. The inner ends 39 of the latching arms 34 are bent rearwardly and are hooked through suitable openings in an operating handle 40 in the manner shown in Figures 2 and 4 of the drawings.

The operating handle 40 is pivotally mounted on the bracket 20 by means of a rivet 41 or other suitable pin support. The lower end of the operating handle 40 is shaped to provide a handle portion 42, while the upper end of the operating handle 40 has a depressed central portion 43 which provides a hub. The portion of the handle 40 surrounding the hub 43 is slightly enlarged to provide a circular flange portion 44. Suitable apertures are provided in the circular flange portion 44 at diametrically opposite points through which the rearwardly bent ends 39 of the latching arms extend. The latching arms 34 and the operating handle 40 of the fender shield latching mechanism are shown in their locked or latched position by the full line in Figure 2, while their unlatched position is indicated by the dotted lines in Figure 2.

To mount the fender shield 11 on the fender 10, it is simply necessary to hook the shield 11 over the supporting pin 28 and then move the operating handle 40 from its dotted line position, as shown in Figure 2, to its full line position. As the flattened portions 36 on the ends of the latching arms 34 engage the fender 10, the fender shield is progressively flexed into tight engagement on the fender 10.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. The combination comprising a vehicle body part having a downwardly depending side wall portion provided with a wheel opening therein, and a shield mounted on said side wall portion over said opening, said shield being shaped so that in an unflexed position the shield contacts the vehicle body part at its top and two lower corners and is bowed outwardly therefrom between said contacting points opposite said vehicle body part, and means for holding said shield in a flexed position and having its entire edge between said top and said two lower corners of said shield in tight engagement with said vehicle body part.

2. The combination comprising a vehicle body part having a downwardly depending side wall portion provided with a wheel opening therein, and a shield having a curved body part engaging edge and a base edge mounted on said side wall portion over said opening, said shield being vertically supported and held in position on said side wall portion and being shaped so that in an unflexed position the shield engages the vehicle body part in proximity to the top of its curved edge and in proximity to the two lower corners of said curved edge, said curved edge in an unflexed position being bowed outwardly from said vehicle body part, and means for holding said shield in a flexed position with substantially its entire curved edge in contact with and seated on said vehicle body part.

3. The combination comprising a vehicle body part having a downwardly depending side wall portion provided with a wheel opening therein and a shield mounted on said side wall portion over said opening, said shield being shaped so that in an unflexed position the shield contacts the vehicle body part at its top and two lower corners and is bowed outwardly therefrom between said contacting points opposite said vehicle body part, and means for progressively flexing said shield from said contacting points towards points spaced substantially midway between the top and bottom of said shield.

4. As an article of manufacture, a fender shield for disposition over the wheel access opening of a vehicle body part, said shield being shaped to contact said vehicle body part in proximity to its top and also in proximity to its two lower corners and being bowed away from said vehicle body part between said top contacting point and said lower corner contacting points, said shield having means thereon engageable with said vehicle body part for pulling the bowed portion of said shield inwardly into tight engagement with said vehicle body part.

5. As an article of manufacture, a fender shield for disposition over the wheel access opening of a vehicle body part, said shield being shaped to contact said vehicle body part in proximity to its top and also in proximity to its two lower corners and being bowed away from said vehicle body part between said top contacting point and said lower corner contacting points, said shield having cam means thereon engageable with said vehicle body part for progressively flexing said shield into tight engagement with said vehicle body part.

6. As an article of manufacture, a fender shield for disposition over the wheel access opening of a vehicle body part, said shield having a curved body part engaging edge and a base edge, said curved edge of said shield being shaped and arranged to initially contact said body part in proximity to its top and in proximity to its two lower corners, the portion of the curved edge of said shield lying between said initial contacting points being bowed outwardly away from said vehicle body part, and at least one latching member on said shield engageable with said vehicle body part for pulling said bowed portion of said curved edge into tight engagement with said vehicle body part.

7. As an article of manufacture, a fender shield for disposition over the wheel access opening of a vehicle body part, said shield having a curved body part engaging edge and a base edge, said curved edge of said shield being shaped and arranged to initially contact said body part in proximity to its top and in proximity to its two lower corners, the portion of the curved edge of said shield lying between said initial contacting points being bowed outwardly away from said vehicle body part, and a pair of oppositely extending substantially horizontally disposed latching arms on said shield engageable with said vehicle body part for pulling said bowed portion of said curved edge into tight engagement with said vehicle body part.

8. As an article of manufacture, a fender shield for disposition over the wheel access opening of a vehicle body part, said shield having a curved body part engaging edge and a base edge, said curved edge of said shield being shaped and arranged to initially contact said body part in proximity to its top and in proximity to its two lower corners, the portion of the curved edge of said shield lying between said initial contacting points being bowed outwardly away from said vehicle body part, a pair of oppositely extending latching arms mounted on said shield being extensible into and retractable out of engagement with said body part, and an operating handle pivotally mounted on the rear of said fender shield, said latching arms being connected to said operating handle at points thereon located on diametrically opposite sides of the pivot point of said operating handle.

9. As an article of manufacture, a fender shield for disposition over the wheel access opening of a vehicle body part, said shield having a curved body part engaging edge and a base edge, said curved edge of said shield being shaped and arranged to initially contact said body part in proximity to its top and in proximity to its two lower corners, the portion of the curved edge of said shield lying between said initial contacting points being bowed outwardly away from said vehicle body part, and latching members on said shield located at intermediate points on said curved edge between the top thereof and the two lower corners, said latching members being mounted for movement into and out of engagement with said vehicle body part and being arranged to progressively flex said curved edge of said shield into tight engagement with said vehicle body part throughout substantially its entire length.

ARTHUR P. FERGUESON.